Feb. 8, 1966 N. DUNLAP 3,233,441
PRESS STRUCTURE FOR TEAR OPEN CAN LID DIE
Filed Feb. 14, 1963 5 Sheets-Sheet 1

INVENTOR.
NORMAN DUNLAP

BY *Toulmin & Toulmin*

ATTORNEYS

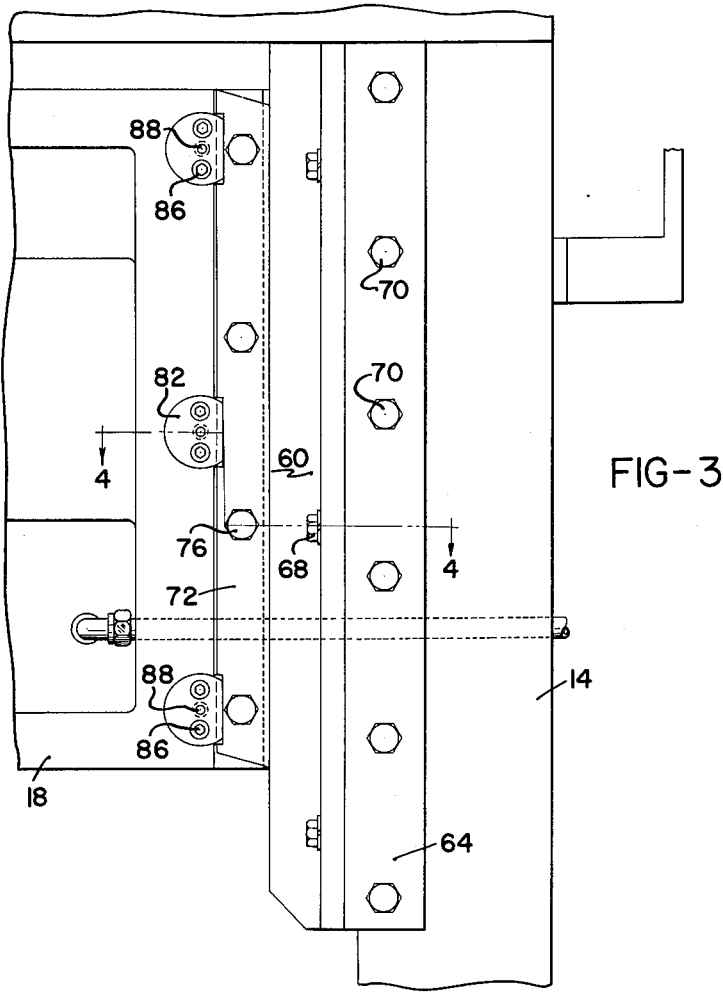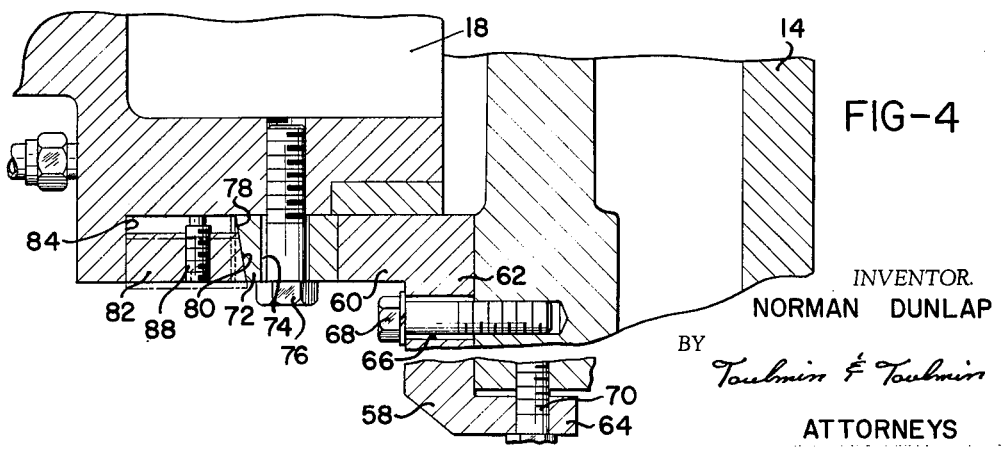

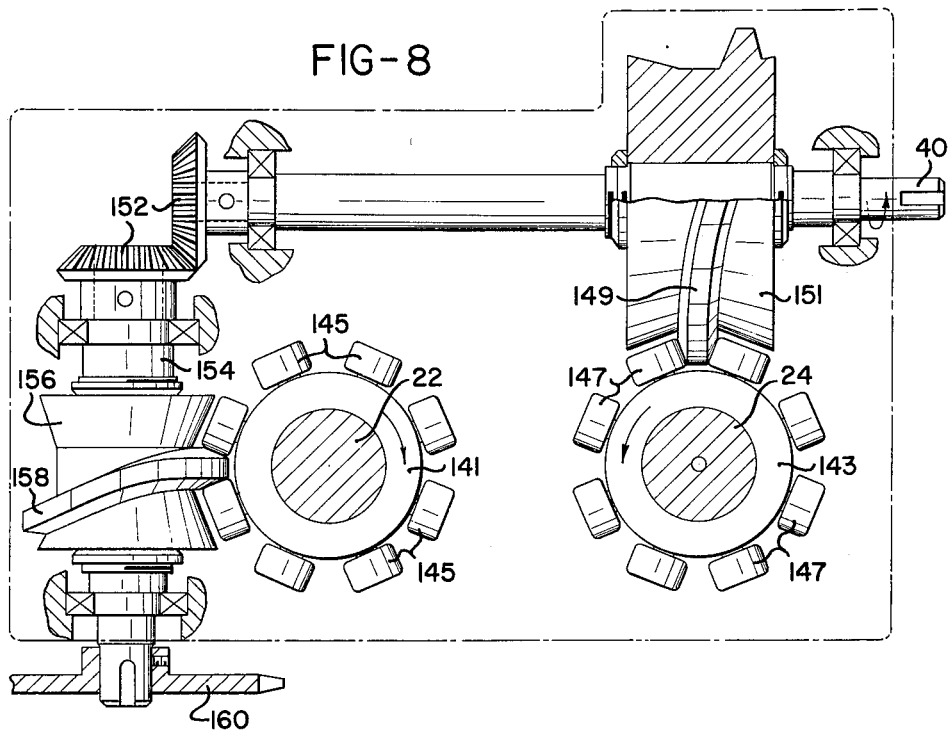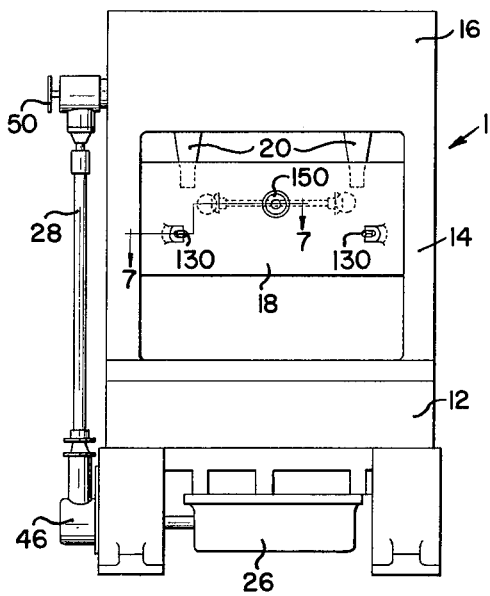

Feb. 8, 1966    N. DUNLAP    3,233,441
PRESS STRUCTURE FOR TEAR OPEN CAN LID DIE
Filed Feb. 14, 1963    5 Sheets-Sheet 5
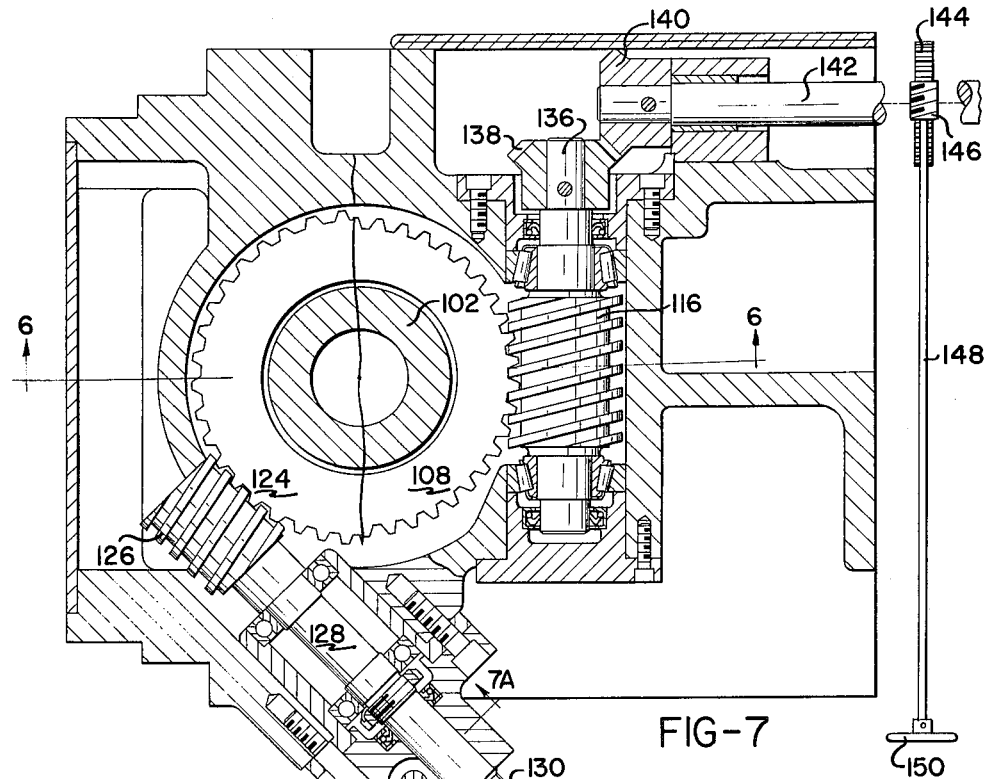
FIG-7
FIG-7A
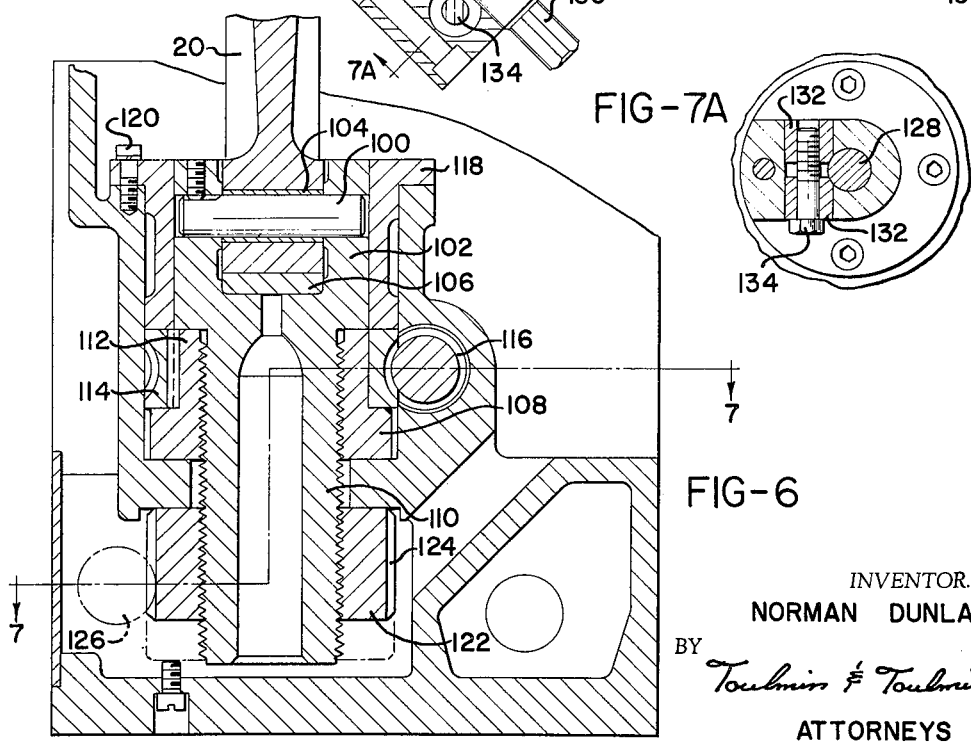
FIG-6
INVENTOR.
NORMAN DUNLAP
BY
Toulmin & Toulmin
ATTORNEYS

United States Patent Office 3,233,441
Patented Feb. 8, 1966

3,233,441
PRESS STRUCTURE FOR TEAR OPEN CAN LID DIE
Norman Dunlap, St. Marys, Ohio, assignor to The Minster Machine Company, Minster, Ohio
Filed Feb. 14, 1963, Ser. No. 259,480
2 Claims. (Cl. 72—31)

This invention relates to press structures and is particularly concerned with mechanical press structures for actuating die sets that require precise supporting and precise movements.

In the art of actuating die sets for the forming or cutting of work members, it is not often the case that extremely high degrees of precision with respect to movements of the die parts are required. For this reason most mechanical presses are adequate for use with ordinary die sets for cutting and forming operations. However, there are instances wherein extremely precise control of the movements of the parts of the die sets are necessary and great difficulty has been experienced in constructing presses suitable for such purposes. It is in particular connection with a press structure of this nature that the present invention is concerned.

A recent development in the field of cans for food stuffs and beverages is what is referred to as a "snap open" or "tear open" can lid. These lids are metal lids, usually aluminum, which are scored in such a manner that substantially the entire lid can be torn off a can, or so that a portion of the lid can be torn out to form a pouring opening. These lids are quite satisfactory in operation but because the cans are sometimes under pressure and because of the necessity of the lid being strong enough to withstand a certain amount of abuse during handling, it is absolutely essential that the lids be made within close limitations.

The close limitations occur in connection with the scoring of the lids to define the region that will be torn out and in connection with the application to the lid of a tab that is attached to the portion of the lid that is to be torn out. The scoring must be deep enough to provide for easy tearing out of the removable portion of the lid while, at the same time, the scoring must be shallow enough to maintain the strength of the lid to hold pressure and to permit the can to be handled.

The tab is applied to the lid by raising a blister or projection on the lid and placing the tab on the projection, and then striking the projection down to clamp the tab to the lid. This operation also must be performed with precision so that the lid is not damaged and so that the tab is firmly anchored to the lid.

In carrying out the steps necessary to form a lid of this type, blanks are set into a progressive die and are indexed from step to step in the die and the various operations necessary to form the scoring in the lid and to secure the tab thereto are carried out. These dies must run at high speeds to produce can lids rapidly enough to make the entire operation economically practical and the high speed of operation required, together with the precision that must be maintained establishes extremely exacting requirements for a mechanical press that have not heretofore been met by any press structure known to me.

With the foregoing in mind, it will be evident that a primary object of the present invention is the provision of a mechanical press having as a primary characteristic, the possibility of continuous operation at high speed and precision actuation of die sets placed therein.

Another object of the present invention is the provision of a mechanical press in which the structure of the press platen can be adjusted with precision and the platen can be locked in its position of adjustment.

Still another object of this invention is the provision of a mechanical press having a drive for actuating indexing die parts in synchronism with the operation of the press.

A further object of this invention is the provision of a press having guiding means for the press platen which can be accurately adjusted to provide accurate guiding of the press platen.

These and other objects and advantages of the present invention will become more apparent upon reference to the following specifications taken in connection with the accompanying drawings in which:

FIGURE 3 is a fragmentary view drawn at enlarged scale showing the guiding arrangement for the press platen;

FIGURE 4 is a sectional view indicated by line 4—4 on FIGURE 3 and drawn at still larger scale showing an adjustment for the press platen guiding arrangement;

FIGURE 5 is a somewhat diagrammatic rear elevational view of the press structure showing the adjusting mechanism for adjusting the platen in the press;

FIGURE 6 is a fragmentary section view indicated by line 6—6 on FIGURE 7 showing in detail the adjustable connection between one side of the platen and the actuating connection rod therefor;

FIGURE 7 is a sectional view indicated by line 7—7 on FIGURES 5 and 6 showing the locking arrangement for locking the adjustment for the platen in adjusted position;

FIGURE 7a is a fragmentary sectional view indicated by line 7a—7a on FIGURE 7 showing a locking arrangement for an adjusting shaft; and FIGURE 8 is a more or less diagrammatic sectional view indicated by line 8—8 on FIGURE 2 showing a drive arrangement for driving a pair of shafts that are connected to indexing parts of a die set in the press.

Figure 1:
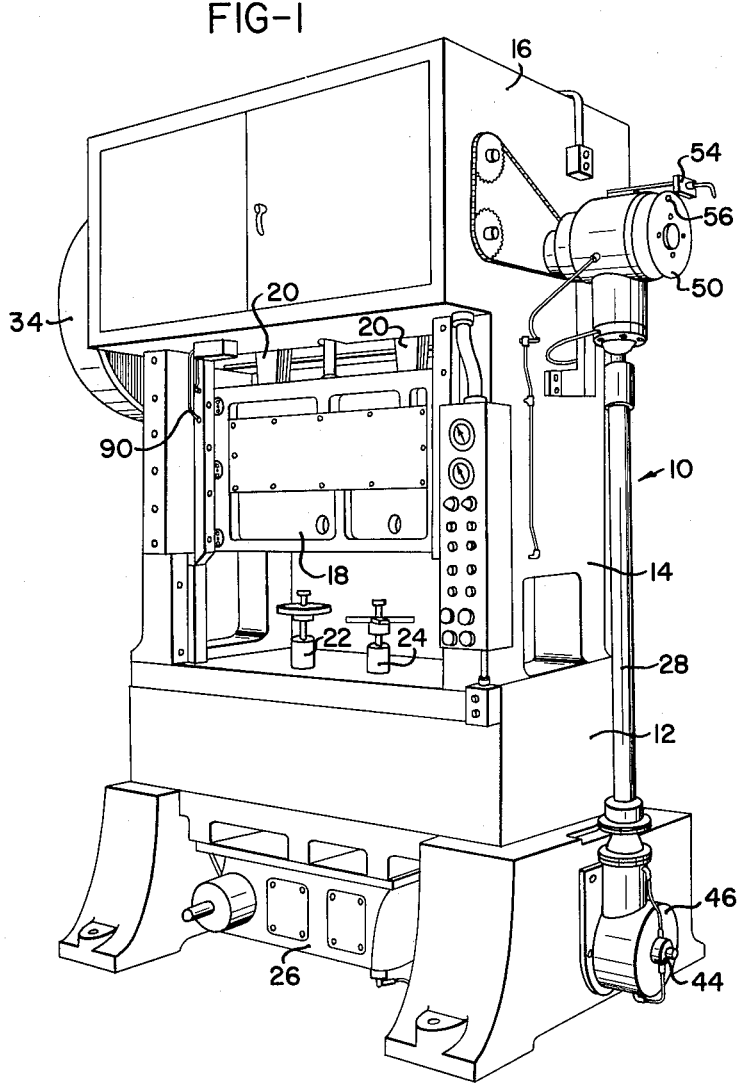
FIGURE 1 is a prospective view of a press constructed according to the present invention.

Referring to the drawings somewhat in more detail, the press illustrated therein comprises a frame 10 which includes a bed portion 12, uprights 14 and a head 16. Slideably guided between uprights 14 is a platen 18 that is actuated by connection rods 20 that extend from the platen up into the head and are connected in the head to a crankshaft.

The bed 12 of the press is adapted for receiving dies that include indexing parts and for actuating the indexing parts there are the shafts 22 and 24 extending vertically downwardly through the bed into a drive arrangement 26. Drive arrangement 26 has an input shaft extending laterally through the side of the press and drivingly connected with the lower end of a vertical drive shaft 28 at one side of the press, the upper end of which is drivingly connected with one end of the aforementioned crankshaft.

The other end of the crankshaft is arranged for being driven by any suitable drive motor that will deliver the proper amount of power at the desired speed. As will be seen in FIGURE 2 the drive motor is indicated at 30 and is connected to crankshaft 32 through the medium of a pneumatically operated clutch brake mechanism 34. The clutch brake mechanism is operable to rotate crankshaft 32 continuously, or it can be adjusted to provide for a single revolution of the crankshaft and the brake portion of the clutch brake is adapted for quickly stopping the crankshaft at any time that an emergency control is operated.

Figure 2:
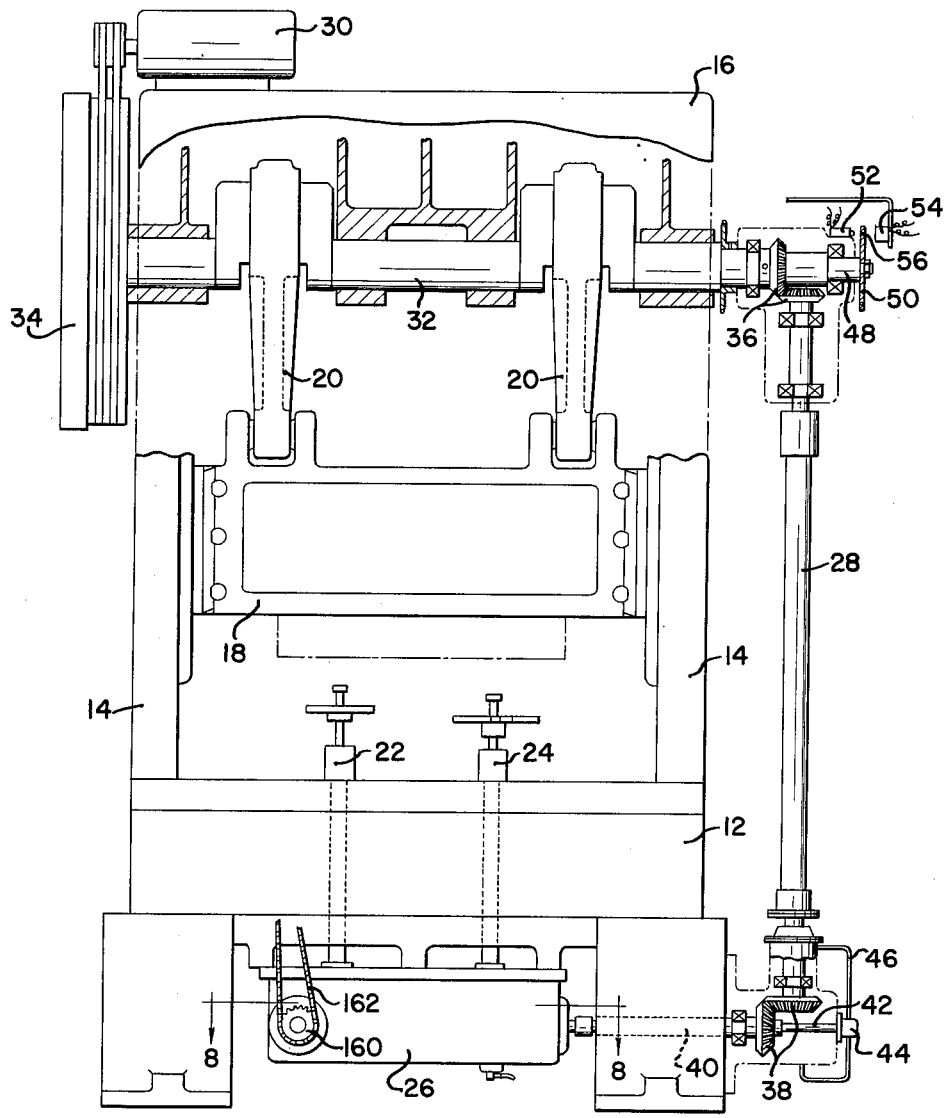
FIGURE 2 is a front view of the press partly in section showing details of construction of the press.

FIGURE 2 will also show that shaft 28 is connected to the crankshaft by bevel gears 36 at the upper end of the said shaft while at the lower end of the said shaft similar bevel gears 38 connect shaft 28 with input shaft 40 of the drive 26. These gears are adjusted to be without play and are pressure lubricated.

Shaft 40 also has an extension 42 that drives a high-pressure oil pump 44 that supplies lubricant via conduit 46 to bearings and surfaces that are to be pressure lubricated.

The crankshaft 32 also has an extension 48 on which is mounted an apertured disc 50 which serves as a mask between a light source 52 and a photocell pickup 54. The disc 50 has a single aperture 56 therein and this aperture, cooperating with the light source and photocell, is utilized to check the relative positions of crankshaft 32 and indexing shaft 22 and 24 once during each revolution of the crankshaft.

FIGURES 3 and 4 show in some detail the guiding arrangement for the press platen. The press uprights 14 have mounted on the inner corners thereof the gib members 58 which comprise the gib portions 60 at the corners of the platen and which also include the relatively long legs 62 extending along the inside of the pertaining upright and the shorter leg portions 64 extending across the outer face of the upright. Legs 62 have slots 66 therein through which the clamp bolts 68 extend. The legs 64 also receive clamp bolts 70. By means of the bolts 68 and 70 the gib portions 60 can be adjusted into close sliding engagement with the bearing bars 72 carried in the corners of the platen.

Also carried by the platen are adjustable members 72 which engage one surface of the gib portions 60 of the gib members. Adjustable members 72 have slots 74 through which extend clamping bolts 76.

To provide for precise adjustment of bars 72 laterally of the press platen and into sliding engagement with gib portions 60, the side of member 72 opposite the gib portion is provided with inclined surfaces 78. These inclined surfaces are adapted for engagement by correspondingly inclined surfaces 80 which are formed on one side of otherwise substantially cylindrical adjusting elements 82. Adjusting elements 82 fit in correspondingly shaped recesses 84 formed in the platen and are connected to the platen by cap screws 86 while being held in any predetermined adjusted spaced relation to the platen by the adjustable abutment screws 88.

The aforementioned platen guiding arrangement provides for extremely accurate guiding of the platen in its reciprocal movements between the uprights. The clearances between the platen and the guiding surfaces of the gib members are maintained quite small and it is preferable to maintain these interengaging surfaces lubricated by the application of lubricating fluid under pressure as by pumping the lubricating fluid through conduit means 90 to the said surfaces. A supply of lubricant under pressure will permit rapid continuous movement of the press platen while accurately guiding the press platen and without danger of the platen supporting and guiding surfaces becoming over heated and seizing or scoring.

The platen 18, as mentioned before, is connected to crankshaft 32 by connecting rod means 20 so that rotation of the crankshaft will cause reciprocation of the platen. It is important, however, for the platen to be adjustable within the frame so that the exact end position, particularly the lower end position of the platen can be closely controlled. This is essential in connection with the production of certain work members, particularly can lids and the like, where scoring of the work members is a work operation because such scoring must be held to within extremely close limits.

FIGURES 6, 7, and 7a illustrate a preferred arrangement not only for effecting the aforementioned adjustment but also of locking the platen to the connecting rods in its adjusted position thereon so that on repetitive strokes of the press, the platen will take exactly the same stroke between exactly the same limits thereby producing work pieces that are precisely operated to within close limits.

FIGURE 7 is a fragmentary plan sectional view indicated by line 7—7 on FIGURE 5 and also indicated by line 7—7 on FIGURE 6 whereas FIGURE 6 is a vertical sectional view indicated by line 6—6 on FIGURE 7. In FIGURE 6 the lower end of a connecting rod 20 will be seen and it will also be seen that this connecting rod is connected by a pin 100 with the upper end of a large screw 102. A bushing 104 provides a close long wearing close fit between connecting rod 20 and pin 100 while a block 106 is disposed between the lower end of connecting rod 20 and the bottom of the recess in the upper end of the screw into which the connecting rod extends and provides a load bearing arrangement that will sustain heavy loading on the platen without the pin 100 and bushing 104 being overloaded and without there being any substantial amount of deflection of the platen relative to the connecting rods. Rather, the load imposed on the platen is transmitted directly to the connecting rod by way of a solid bearing block 106.

Screw 102 extends downwardly into a bore in the platen and within this bore is a nut 108 engaging the screw threads 110 of the screw. The nut has keyed thereto, by key 112, a worm wheel 114 that is engaged by a rotatable worm 116. The worm wheel and nut are retained within the recess in which they are mounted by a retaining member 118 fastened to the platen by screws 120. The nut is thus held against axial movement in the recesses and, therefore, when it is rotated by operation of worm 116, the screw 102 is caused to move axially.

According to the present invention the extreme lower end of screw 102 receives another nut 122 having formed on the outer periphery thereof a worm wheel portion 124 that is engaged by another worm 126. Nut 122 is a locking nut and serves to lock screw 102 fixedly in place in any adjusted position thereof.

Worm 126 will be seen in FIGURE 7 to be mounted on a shaft 128 which terminates externally of the platen in a square portion 130 adapted for receiving a wrench or a crank. The shaft is adapted for being locked in adjusted position by the locking device illustrated in FIGURE 7a wherein it will be seen that there are two clamping blocks 132 adapted for being drawn together into clamping engagement with shaft 128 by a clamp bolt 134.

FIGURE 7 will also show that worm 116 is mounted on shaft 136 rotatably journaled in the platen and held therein against axial movement so that a predetermined rotation of the worm will lead to a predetermined amount of adjustment of screw 102.

A bevel gear 138 is mounted on the inner end of shaft 136 and meshes with a bevel gear 140 on the end of an adjusting shaft 142 that extends laterally in the platen to the region of the other connecting rod 20 where there is located an adjusting arrangement the same as has been described above.

In about the center of the platen, shaft 142 has a worm wheel 144 thereon engaged by a worm 146 on the inner end of a shaft 148 that extends rearwardly to the back of the platen where there is provided means for adjusting shaft 148, for example, in the form of a hand wheel 150.

The described arrangement provides for precise adjustment of the platen on the connecting rods and locking of the platen to the connecting rods in its adjusted position.

Adjustment is accomplished by releasing shafts 128 and rotating these shafts to loosen their respective locking nuts 124. Thereafter hand wheel 150 can be availed of for rotating worms 116 thereby turning their respective nuts 108 thus causing axial movement of screws 102 in the platen. When the desired adjustment has been effected, shafts 128 are actuated to pull their respective nuts 122 up tight into clamping position and thereupon shafts 128 are locked by tightening bolts 134 and the adjustment of the platen is then locked in place.

The arrangement of the present invention also involves structure for effecting the precision indexing of movable parts of die sets mounted in the press. This is the drive arrangement generally indicated at 26 and which is driven from shaft 28 by way of the aforementioned drive unit input shaft 40. This unit is shown somewhat more in detail in FIGURE 8 which is a plan section through the unit. In FIGURE 8 it will be seen that the unit comprises the upstanding shafts 22 and 24 on which the indexable portions of the die set are mounted.

Each of these shafts, within the unit has mounted thereon a driver 141, 143 respectively. Each driver has mounted thereon rollers 145, 147 respectively. The rollers 147 of driver 143 pertaining to shaft 24 are engaged without play by a spiral rib 148 formed on the periphery of member 151 which is fixed to input shaft 40. As input shaft 40 rotates, member 150 will operate as a worm and driver 143 will operate as a worm wheel and, depending upon the configuration of rib 149, driver 143 will index from position to position and will dwell in its indexed position for a predetermined length of time.

The described arrangement effects precise indexing of shaft 24 and holding of the shaft 24 precisely in its indexed position. All lost motion can be designed out of these indexing arrangements so that each angular position of input shaft 40 corresponds to a predetermined indexed position of shaft 24.

Input shaft 40 at its inner end is connected by bevel gear means 152 with another shaft 154 on which is mounted a member 156 having a driving rib 158 thereon that engages between rollers 144 of driver 141 pertaining to shaft 22.

This arrangement, similarly, provides for precise indexing of shaft 22 as input shaft 40 is rotated. Bevel gears 152 are constructed and arranged to eliminate lost motion therebetween so that both shafts 22 and 24 are characterized in operation by exact indexing movements and by occupying exactly indexed positions.

Shaft 154 may extend out the front of the unit and carry a sprocket 160 which can be availed of for driving a chain 162 (FIGURE 2) leading upwardly to the die set in the press and being operable for actuating a feed mechanism or the like.

In every case where close fits are maintained an adequate supply of lubricant thereto is maintained, and preferably by supplying lubricant thereto under pressure. By maintaining lubricant supply under pressure much closer fits can be maintained in continuous and rapid operation than would otherwise be the case. In this manner the extremely close control of the movements of the parts of the die set and the stroke of the press platen that has been referred to can be maintained.

As an additional precaution against any misalignment of the parts of the die set and to prevent the die set and the press from operating any way except in exact synchronization, the disc 50, the light source 52 and the photocell pickup 54 are employed in a manner not shown in the present application. The disc 50, however, is fixed to the crankshaft as illustrated in FIGURE 2, and thus can indicate the exact angular position of the crankshaft by an aperture therein which will permit the light beam to fall on the photocell when the crankshaft is in a certain position.

A similar pickup associated with a movable part of the die set when connected in circuit with the pickup on the crankshaft can be employed to check the position of the said movable part of the die set relative to the crankshaft once for each revolution of the crankshaft and to interrupt operation of the press if any misalignment or lack of synchronization arises.

It will be evident that the most exact checking of the synchronization and alignment will thus be effected and it will be insured that the reciprocation of the press platen and the indexing movements of the parts of the die set will always be in exact conformity.

It will be understood that this invention is susceptible to modification in order to adapt it to different usages and conditions; and accordingly, it is desired to comprehend such modifications within this invention as may fall within the scope of the appended claims.

I claim:

1. The combination, in a press: of a press frame including a head, a bed, and uprights, a press platen, gib means guiding the press platen in sliding movement on said uprights, a crankshaft rotatable in the head, connecting rod means connecting the crankshaft with the platen, shaft means in the bed for connection to indexable elements of a die set, drive means carried by the bed connected to said shaft means for indexing the shaft means, and a drive shaft connected at one end to said crankshaft and at the other end to said drive means for actuating said shaft means in timed relation to the rotation of the crankshaft, a disc on the crankshaft and having aperture means therein spaced radially from the center of rotation of the disc, a light source on one side of the disc the same radial distance from the center of rotation of said disc as said aperture means, and a photocell on the other side of the disc axially aligned with the light source whereby the photocell is illuminated by the light source in conformity with the angular position of the crankshaft to provide signal means for comparison with signal means developed by said indexable means in conformity with the position thereof for checking the position of said indexable means relative to the position of said crankshaft during continued rotation of the crankshaft.

2. The combination according to claim 1 in which said aperture means consists of a single aperture in the disc so that a single signal is developed during an interval corresponding to one complete revolution of the crankshaft for comparison with a single signal developed by said indexable means during the same said interval.

References Cited by the Examiner

UNITED STATES PATENTS

| | | | |
|---|---|---|---|
| 536,990 | 4/1895 | Hayes et al. | 100—223 |
| 1,653,030 | 12/1927 | Zeh | 308—3 |
| 1,778,358 | 10/1930 | Glasner | 113—38 |
| 1,779,093 | 10/1930 | Haverbeck | 113—38 |
| 1,887,121 | 11/1932 | Dietzel | 308—3 |
| 2,608,253 | 8/1952 | Battles et al. | 100—257 |
| 2,984,175 | 5/1961 | Wahl | 100—257 |
| 3,024,719 | 3/1962 | Englund | 100—53 |
| 3,078,751 | 2/1963 | Hill | 100—53 |
| 3,083,635 | 4/1963 | O'Hare | 100—223 |

CHARLES W. LANHAM, *Primary Examiner.*